Feb. 7, 1956  E. L. WISHON  2,733,779
SAFETY BRAKE FOR CARS AND TRUCKS
Filed Dec. 19, 1952
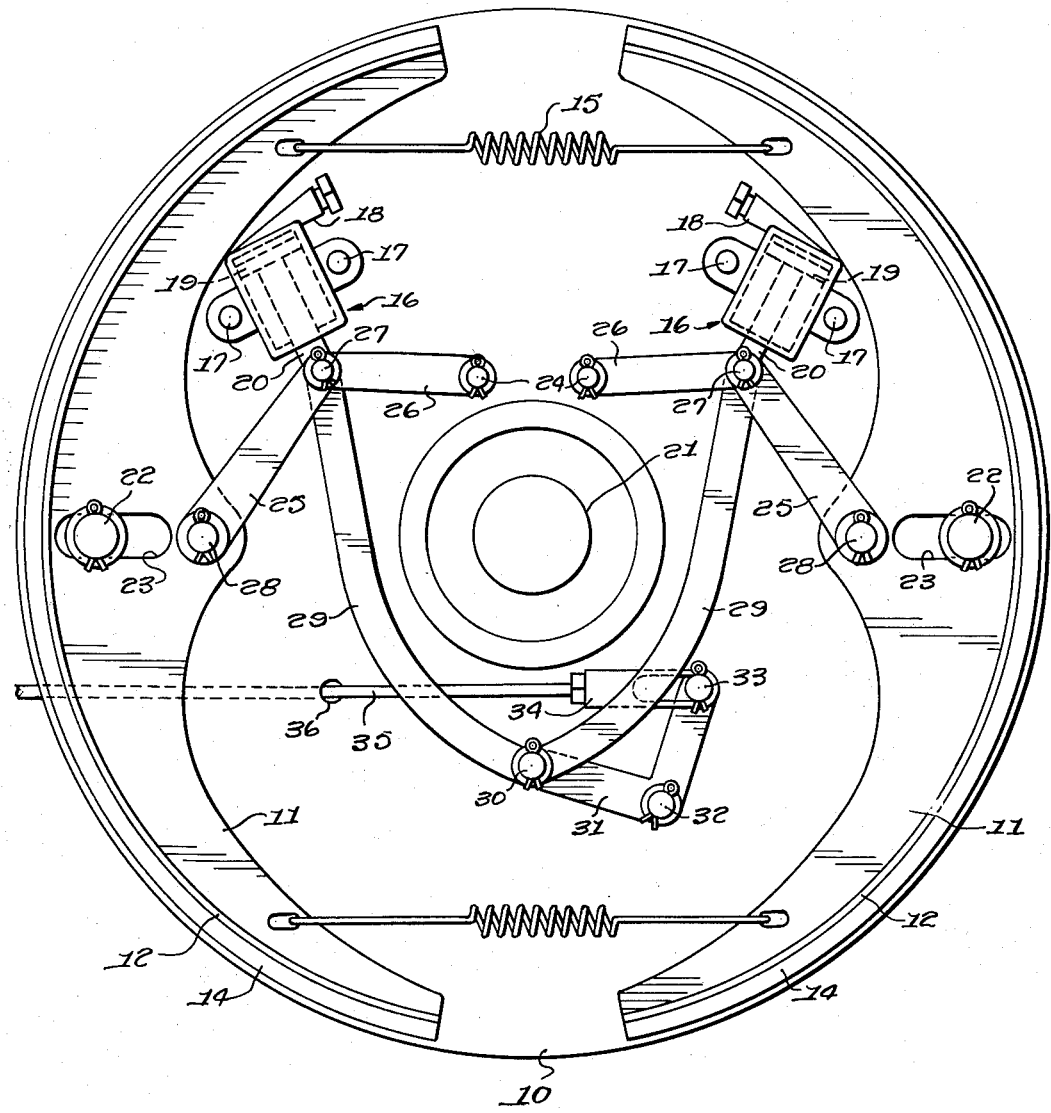
INVENTOR.
Evia L. Wishon,
BY Victor J. Evans & Co.
ATTORNEYS

United States Patent Office 2,733,779
Patented Feb. 7, 1956

2,733,779

SAFETY BRAKE FOR CARS AND TRUCKS

Evia L. Wishon, Rolla, Mo.; Mary A. Kamper, administratrix of Evia L. Wishon, deceased, assignor of one-half to M. E. Sooter, Rolla, Mo.

Application December 19, 1952, Serial No. 326,867

1 Claim. (Cl. 188—106)

This invention relates to a vehicle, such as an automobile or truck, and more particularly to a brake for such a vehicle.

The object of the invention is to provide a brake assembly for a vehicle which is constructed so as to insure that the entire surface of the brake shoes will be moved uniformly so that the brake lining will be moved into engagement with the brake drum uniformly and efficiently to thereby provide greater frictional engagement between the brake lining and brake drum whereby the brakes will be operated with the maximum amount of safety.

Another object of the invention is to provide a brake assembly which is adapted to be actuated by both the vehicle hydraulic system and the emergency brake and whereby there will be greater braking power and less wear on the brake lining.

A further object of the invention is to provide a vehicle safety brake which is extremely simple and inexpensive to manufacture.

Other objects and advantages will be apparent during the course of the following description.

In the accompanying drawings, forming a part of this application, and in which like numerals are used to designate like parts throughout the same, the single figure is an elevational view showing the brake assembly, constructed according to the present invention.

Referring in detail to the drawing, the numeral 10 designates the back plate of the brake assembly, while the brake assembly further includes a pair of brake shoes 11 which are movably connected to the back plate 10. Each of the brake shoes 11 includes an arcuate flange 12 that has a brake lining 14 arranged contiguous thereto, and the brake linings 14 are mounted for movement into and out of frictional engagement with the usual brake drum. A pair of coil springs 15 interconnect the brake shoes 11 together, and the coil springs 15 serve to normally urge the brake shoes 11 towards each other.

Interposed between the pair of brake shoes 11 is a pair of hydraulic cylinders 16. Each of the cylinders 16 is secured to the back plate 10 by suitable securing elements such as rivets 17, and the hydraulic cylinders 16 are adapted to be connected to a source of hydraulic fluid by means of conduits 18. The pair of conduits 18 are adapted to receive hydraulic fluid simultaneously upon depression or actuation of the vehicle foot pedal.

Reciprocably or slidably mounted in each of the cylinders 16 is a piston 19, and connected to the piston 19 is a rod 20. It will be seen that there are a pair of the rods 20. The back plate 10 is provided with a central opening 21 for the projection therethrough of the usual vehicle axle.

Each of the brake shoes 11 is provided with a slot 23 for slidably receiving therein an anchor pin 22, and the pins 22 are secured to the back plate 10. A pair of body pins 24 are spaced apart with respect to each other, and the body pins 24 are also anchored or secured to the back plate 10. A pin 27 serves to pivotally connect a pair of links 25 and 26 to the outer end of the rod 20. The other end of the link 26 is pivotally mounted on the pin 24. Similarly, the other end of each of the links 25 is pivotally connected to the brake shoe 11 by a pin 28.

There is further provided a pair of arcuate arms 29, and one end of each of the arms 29 is pivotally mounted on the pins 27. The other ends of the arms 29 are pivotally connected together by means of a pin 30.

A means is provided for permitting the brake of the present invention to be actuated by the usual emergency brake in the vehicle, and this means comprises an L-shaped lever 31 which has one end pivotally connected to the pin 30. The lever 31 is pivotally connected to the back plate 10 by means of an anchor pin 32, and a bushing 34 is pivotally connected to the other end of the lever 31 by means of a pin 33. A stem 35 extends through an opening 36, and the stem 35 has one end connected to the bushing 34. The other end of the stem 35 is adapted to be connected or actuated by the vehicle emergency brake as when the vehicle is being parked.

In use, when pressure is applied to the foot pedal in the vehicle, the pistons 19 in the cylinders 16 are simultaneously actuated whereby the rods 20 are forced outwardly of the cylinders 16. This causes the links 25 to move the brake shoes 11 outwardly away from each other so that the entire surface of the brake linings 14 are simultaneously moved into engagement with the brake drum. The pins 22 project through the slots 23 in the brake shoes 11. When the emergency brake is applied, the stem 35 will pivot the lever 31 on the pin 32 whereby the arms 29 will be moved to thereby swing the links 25 that cause the brake shoes 11 to move. When the emergency brake is released, or when pressure on the brake pedal is released, the coil springs 15 will cause the brake shoes to return to their off or normal position out of engagement with the brake drum.

From the foregoing, it is apparent that a safety brake for vehicles such as cars and trucks has been provided. In the construction shown it is to be understood that the various pins can have cotter keys and washers thereon to prevent the various links from becoming accidentally disengaged therefrom. In the brake of the present invention the brake linings will engage the brake drum evenly all the way around to thereby insure that there will be greater friction and more efficient braking power and there will also be less wear on the brake linings. Also, the present invention will not require any adjusting to be made and the connection between the stem 35 and lever 31 may be such that there is slight play so that the brake shoes can be actuated by the foot pedal without affecting the emergency brake.

I claim:

In a brake assembly, a back plate, a pair of spaced parallel anchor pins extending from said back plate, a pair of movable brake shoes each provided with a slot for receiving said anchor pins, each of said brake shoes including an enlarged portion intermediate its ends, said enlarged portion being arranged contiguous to said slots, a lining carried by each of said shoes for movement into and out of engagement with a brake drum, a pair of spaced, parallel coil springs interconnecting said brake shoes together for normally urging the linings out of engagement with the brake drum, said coil springs being arranged on opposite sides of the enlarged portions of said brake shoes, a pair of hydraulic cylinders interposed between said brake shoes and secured to said back plate and adapted to be connected to a source of hydraulic fluid under pressure, said cylinders being arranged angularly with respect to each other, apertured ears extending outwardly from each of said cylinders, securing elements extending through said ears and into engagement with said back plate, a rod extending from each of said cylinders, a pair of body pins connected to said back plate, a pair of links each having an end pivotally connected to said rod, the links of each pair being arranged angularly with respect to each other, one of said links being pivotally connected to a body pin and the other of said links being pivotally connected to the enlarged portion of a brake shoe, a curved arm pivotally connected to the outer end of each of said rods, said arms being pivotally connected to each other, an L-shaped lever pivotally connected to said arms at the junction of said arms, an anchor pin pivotally connecting the intermediate portion of said lever to said back plate, a pin member connected to the free end of said lever, a bushing having a slot for receiving the pin member on the end of said lever, and a stem of reduced diameter connected to said bushing and adapted to be connected to the vehicle emergency brake, said back plate having an opening therein for the slidable projection therethrough of said stem.

References Cited in the file of this patent

UNITED STATES PATENTS

| 2,051,088 | Kittle et al. | Aug. 18, 1936 |
| 2,503,489 | James | Apr. 11, 1950 |
| 2,503,615 | Gooch | Apr. 11, 1950 |

FOREIGN PATENTS

| 253,902 | Great Britain | Dec. 12, 1927 |
| 359,203 | Great Britain | Oct. 22, 1931 |